US009838185B2

(12) United States Patent
Lindoff et al.

(10) Patent No.: US 9,838,185 B2
(45) Date of Patent: *Dec. 5, 2017

(54) CHANNEL QUALITY INDEX DETERMINATION

(71) Applicant: Telefonaktiebolaget LM Ericsson (publ), Stockholm (SE)

(72) Inventors: Bengt Lindoff, Bjärred (SE); Fredrik Nordström, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 93 days.

This patent is subject to a terminal disclaimer.

(21) Appl. No.: 15/139,890

(22) Filed: Apr. 27, 2016

(65) Prior Publication Data

US 2016/0241375 A1 Aug. 18, 2016

Related U.S. Application Data

(63) Continuation of application No. 14/238,221, filed as application No. PCT/EP2012/063178 on Jul. 5, 2012, now Pat. No. 9,363,697.

(Continued)

(30) Foreign Application Priority Data

Aug. 12, 2011 (EP) .................. 11177396 A

(51) Int. Cl.
*H04W 72/08* (2009.01)
*H04L 5/00* (2006.01)
(Continued)

(52) U.S. Cl.
CPC ......... *H04L 5/0057* (2013.01); *H04B 17/309* (2015.01); *H04L 1/0026* (2013.01);
(Continued)

(58) Field of Classification Search
CPC .................................................. H04W 72/085
See application file for complete search history.

(56) References Cited

U.S. PATENT DOCUMENTS

2006/0171449 A1 8/2006 Lindoff et al.
2007/0071145 A1* 3/2007 Perets .................. H04L 1/0026
375/346

(Continued)

FOREIGN PATENT DOCUMENTS

CN 101707514 A 5/2010
EP 2157717 A1 2/2010
(Continued)

OTHER PUBLICATIONS

European Telecommunications Standards Institute, "LTE; Evolved Universal Terrestrial Radio Access (E-UTRA); Physical layer procedures (3GPP TS 36.213 version 10.1.0 Release 10)", Technical Specification, ETSI TS 136 213 V10.1.0, Apr. 1, 2011, pp. 1-117, ETSI, France.

(Continued)

*Primary Examiner* — Asghar Bilgrami
(74) *Attorney, Agent, or Firm* — Coats & Bennett, PLLC

(57) ABSTRACT

A method of a transceiver arranged to operate in a cellular communication system comprising cells is disclosed. The method comprises receiving a transmission from a first cell; determining an interfering signal and its occupation in time and/or frequency; determining reduced values in the received signal corresponding to the occupation in time and/or frequency of the interfering signal; and measuring a quotient between desired signal and non-desired signal of reference symbols of the received signal. A channel quality index, CQI, is formed taking into account reduction of values performed at the reducing, and the CQI is reported to (Continued)

the communication system. A transceiver and computer program for the same are also disclosed.

18 Claims, 7 Drawing Sheets

Related U.S. Application Data

(60) Provisional application No. 61/525,266, filed on Aug. 19, 2011.

(51) Int. Cl.
*H04L 1/18* (2006.01)
*H04L 1/20* (2006.01)
*H04W 24/08* (2009.01)
*H04B 17/309* (2015.01)
*H04L 1/00* (2006.01)
*H04B 17/24* (2015.01)
*H04B 17/373* (2015.01)

(52) U.S. Cl.
CPC .............. *H04L 1/1812* (2013.01); *H04L 1/20* (2013.01); *H04W 24/08* (2013.01); *H04W 72/085* (2013.01); *H04B 17/24* (2015.01); *H04B 17/373* (2015.01); *H04L 1/0003* (2013.01); *H04L 1/0009* (2013.01); *H04L 1/203* (2013.01)

(56) References Cited

U.S. PATENT DOCUMENTS

| | | | | |
|---|---|---|---|---|
| 2010/0197330 | A1* | 8/2010 | Astely | H04L 5/003 455/507 |
| 2010/0309801 | A1* | 12/2010 | Jongren | H04J 11/0023 370/252 |
| 2011/0085513 | A1* | 4/2011 | Chen | H04W 72/042 370/330 |
| 2012/0020319 | A1* | 1/2012 | Song | H04W 72/1231 370/330 |

FOREIGN PATENT DOCUMENTS

| | | |
|---|---|---|
| JP | 2010528525 A | 8/2010 |
| WO | 2005006568 A2 | 1/2005 |
| WO | 2008143566 A1 | 11/2008 |
| WO | 2011018121 A1 | 2/2011 |
| WO | 2011038410 A1 | 3/2011 |

OTHER PUBLICATIONS

Pantech. "Measurement in FDM ICO." 3GPP TSG-RAN WG2 Meeting #73, R2-111299, Taipei, Taiwan, Feb. 21, 2011, pp. 1-3, 3GPP.

Samsung. "Effect of In-Device coexistence on LTE current Implementations." 3GPP TSG-RAN WG2 #71bis, R2-105575, Xian, China, Oct. 11, 2010, pp. 1-3, 3GPP.

* cited by examiner

CHANNEL QUALITY INDEX DETERMINATION

RELATED APPLICATIONS

This application is a continuation of prior U.S. application Ser. No. 14/238,221, filed 11 Feb. 2014, which was the U.S. National Stage of International Application No. PCT/EP2012/063178 filed on 5 Jul. 2012, which claims priority to U.S. Provisional patent Application Ser. No. 61/525,266 filed on 19 Aug. 2011 and European Patent Application Serial No. 11177396.6 filed 12 Aug. 2011, the disclosures of all of which are incorporated by reference herein in their entirety.

TECHNICAL FIELD

The present invention generally relates to a method of providing a Channel Quality Index report, and a transceiver and computer program adapted therefore.

Abbreviations
3GPP 3$^{rd}$ Generation Partnership Project
LTE 3GPP Long Term Evolution
HSPA High-Speed Packet Access
ARQ Automatic Repeat request
HARQ Hybrid ARQ
CQI Channel Quality Index
SNR Signal-to-Noise Ratio
SIR Signal-to-Interference Ratio
SINR Signal-to-Interference-and-Noise Ratio
BLER Block Error Rate
MCS Modulation and Coding Scheme
UL UpLink
DL DownLink
ABS Almost Blank Subframe
RE Resource Element
CRS Common Reference Symbol
ID Identity
IC Interference Cancelling
WWAN Wireless Wide Area Network
USB Universal Serial Bus

BACKGROUND

Cellular system optimized for mobile broadband such as, LTE and HSPA, uses link adaptation and HARQ. These functionalities are introduced for improved throughput performance both from a link and system perspective. In link adaptation, the terminals need to estimate the current radio performance and feedback that information to the network as a CQI. The network node (scheduler) then adapts the MCS. HARQ is then introduced for robust performance, and used for fast retransmission of erroneous decoded blocks. In a typical channel scenario, for optimised performance, a first transmission BLER around 10% is close to optimal from link perspective, and the scheduler is working to choose MCS based the CQI and BLER target.

Traditionally, CQI is solely based on SNR of the received signal. Internally generated decisions like adaptation/nulling/affecting of soft values to known interference are not taken into account, and thereby the CQI reported will not correctly describe the current decoding performance, and the reported CQI may be too optimistic. Thus, this will reduce the throughput in the system, by increasing the first transmission BLER, which typically should operate around 10% for optimized performance, and thereby increasing the packet retransmission rate. In some scheduling solutions some outer loop control is introduced in the scheduler that eventually will take such biased CQI into account, but such loop is normally slow and therefore the interference situation for the terminal could well be changed, for instance by a handover to another cell, before caution is taken by the controller. Hence optimized performance will not necessarily be reached using such outer loop BLER control compensation Thus, the terminal estimates the CQI and reports it to the cellular system, and all reported CQIs are important for the cellular system for working efficiently.

WO 2005/000568 A2 discloses a method for biasing signal-to-interference ratio (SIR) to generate channel quality indicator (CQI) including measuring the packet error rate (PER) of a received signal and comparing the PER to the target PER to generate a correction term. The correction term is combined with the SIR estimation of a reference channel to generate a CQI. The CQI is reported to a transmitter to adjust signal configurations, such as code rate, modulation type, number of codes, power offset.

However, in modern cellular systems, numerous "tricks" are applied, both in the terminals and in the base stations, to improve performance. Some of these tricks may cause the estimated/reported CQIs to give an improper view of the actual channel qualities, which then may imply that the cellular system does not work that efficiently as intended. It is therefore a desire to provide a CQI that better reflects channel quality.

BRIEF SUMMARY

An object of the invention is to at least alleviate the above stated problem. The present invention is based on the understanding that "reduced" values of received signals at the terminal side, gives a different effective code rate than that of the originally assigned and used code rate. This may impact the actual channel quality. The inventors have found that, at least for an overall system efficiency, a CQI reported from a terminal to the cellular system should reflect the actual channel quality, and therefore here provide a set of solutions for an improved CQI reporting.

Here, "reduction" includes deletion, nulling, suppression, or other adaptation of received values that are known or suspected to be influenced by an interferer, where the reduction can be an active measure by deleting, nulling suppressing, etc. the soft values in the receiver or in subsequent processing circuits, or the reduction can be the cause of the interference where the soft values are so corrupt that they cannot be properly used for processing in the transceiver or subsequent processing circuits. In the following disclosure, the terms "reduced" and "reduction" will be used about the soft values of data Res, which is to be interpreted as reducing the influence of the signal value in signal processing performed on the received signal, e.g. at decoding. The reduction can thus be total, i.e. the value is set to zero, or partial, i.e. the value is given an amount implying lower impact.

According to a first aspect, there is provided a method of a transceiver arranged to operate in a cellular communication system comprising cells. The method comprises receiving a transmission from a first cell; determining an interfering signal and its occupation in time and/or frequency; determining reduced values in the received signal corresponding to the occupation in time and/or frequency of the interfering signal; measuring a quotient between desired signal and non-desired signal of reference symbols of the received signal; forming a channel quality index, CQI, based on the measured quotient and an amount of determined reduced values; and reporting the CQI to the communication system.

According to a second aspect, there is provided a method of a transceiver arranged to operate in a cellular communication system comprising cells. The method comprises receiving a transmission from the first cell; measuring a quotient between desired signal and non-desired signal of reference symbols of the received signal; determining an interfering signal and its occupation in time and/or frequency; determining reduced values in the received signal corresponding to the occupation in time and/or frequency of the interfering signal; calculating effective code rate with regard to the reduction; calculating an adapted capacity based on the reduction; mapping the capacity or adapted capacity to a channel quality index, CQI; and reporting the CQI to the communication system.

The method may further comprise, after the step of measuring a quotient, mapping the measured quotient to an estimated capacity; and determining, based on the capacity, whether any reduction is needed to be taken into account, wherein if reduction is determined to be needed to be taken into account, performing the steps of determining reduced values in the received signal, calculating effective code rate and calculating an adapted capacity based on the reducing, and if reduction is not determined to be needed to be taken into account, omitting these steps.

For the methods of the first and second aspects, the cellular system may further comprise a second cell and the second cell covers essentially the whole coverage area of the first cell, wherein the second cell may be arranged to transmit at least one subframe simultaneously with the first cell scheduling transmission, wherein the determination of the interfering signal comprises determination of presence of symbols transmitted during said at least one subframe from the second cell. The second cell may be arranged to transmit at least one subframe comprising no data symbols and only reference symbols such that the first cell is enabled to schedule transmission, and wherein the interfering signal to be taken into account for determining reduced values are corresponding to the reference symbols transmitted from the second cell.

For the methods of the first and second aspects, the determination of the interfering signal may comprise determining a spur signal internally generated in the transceiver.

For the methods of the first and second aspects, the forming of the CQI may further be based on position of occupation in time and/or frequency of the determined reduced values in the subframe. The forming of the CQI may further be based on allocation size of the determined reduced values.

According to a third aspect, there is provided a transceiver arranged to operate in a cellular communication system comprising cells. The transceiver comprises a receiver arranged to receive a transmission from a first cell; an interference monitor arranged to determine an interfering signal and its occupation in time and/or frequency; a reduction determination circuit arranged to determine reduced values in the received signal corresponding to the interfering signal; a signal measuring circuit arranged to measure a quotient between desired signal and non-desired signal of reference symbols of the received signal; a processor circuit arranged to form a channel quality index, CQI, based on the measured quotient and an amount of reduced values performed at the reducing; and a transmitter arranged to transmit a report of the CQI to the communication system.

According to a fourth aspect, there is provided a transceiver arranged to operate in a cellular communication system comprising cells. The transceiver comprises a receiver arranged to receive a transmission from the second cell; a signal measuring circuit arranged to measure a quotient between desired signal and non-desired signal of reference symbols of the received signal; a reduction determination circuit arranged to determine reduced values in the received signal corresponding to interfering symbols of the interfering transmission from the first cell to perform the determination of the reduction, and a processing circuit arranged to calculate effective code rate with regard to the determined reduction, and calculate an adapted capacity based on the determined reduction, wherein the processing circuit is further arranged to map the capacity to a channel quality index, CQI; and a transmitter arranged to transmit a report on the CQI to the communication system. The processing circuit may further be arranged to map the measured quotient to an estimated capacity, and be arranged to determine, based on the capacity, whether any determination of reduction is needed to be taken into account, wherein if reduction is determined to be needed to be taken into account, the processing circuit is arranged to enable the reduction determination circuit to determine reduced values in the received signal, and if reduction is not determined to be needed to be taken into account, be arranged to disable the reduction determination circuit, wherein the estimated capacity from the mapping of the measured quotient is used as the capacity and the calculation of an effective code rate is omitted.

For the third and fourth aspects, the cellular system may further comprise a second cell and the second cell covers essentially the whole coverage area of the first cell, wherein the second cell may be arranged to transmit at least one subframe simultaneously with the first cell scheduling transmission, wherein the determination of the interfering signal may comprise determination of presence of symbols transmitted during said at least one subframe from the second cell. The second cell may be arranged to transmit at least one subframe comprising no data symbols and only reference symbols such that the first cell is enabled to schedule transmission, and wherein the interfering symbols to be determined as reduced by the reduction determination circuit are corresponding to the reference symbols from the second cell.

For the third and fourth aspects, the reduction determination circuit may further be arranged to determine reduced values corresponding to a spur signal internally generated in the transceiver.

For the third and fourth aspects, processor circuit may further be arranged to base the CQI on position of occupation in time and/or frequency of the determined reduced values in the subframe.

For the third and fourth aspects, the processor circuit may further be arranged to base the CQI on allocation size of the determined reduced values.

According to a fifth aspect, there is provided a computer program comprising computer executable instructions, which when executed by a processor of a transceiver is arranged to cause the transceiver to perform the method according to any of the first or second aspects.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
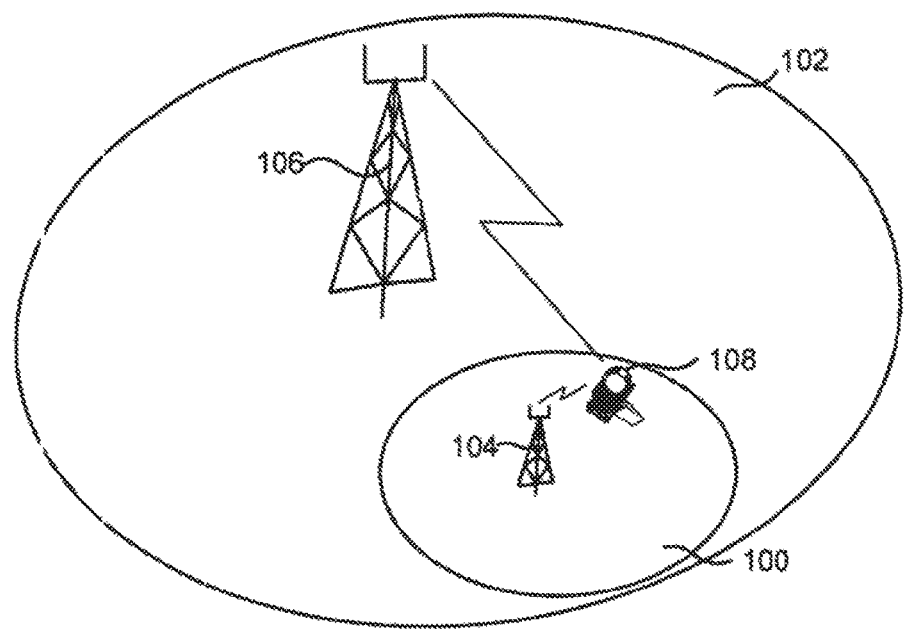
FIG. 1 illustrates a cellular communication system comprising cells wherein the whole coverage area of first cell of one level is essentially covered by a second cell of another level.
Figure 2:
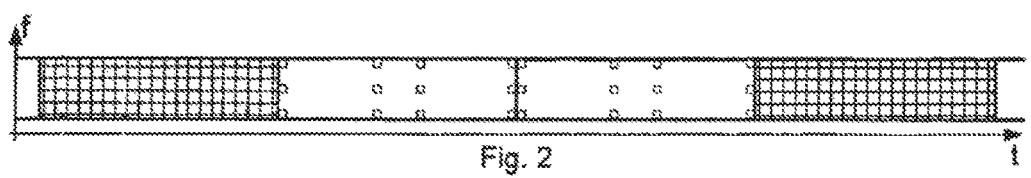
FIG. 2 illustrates a number of subframes transmitted by the second cell.

In some radio scenarios/cases, the terminal could experience significant interference on certain received symbols/resource elements, using the terminology of LTE but similar principle applies for other systems. One such scenario is Heterogeneous Network (HetNet) scenarios where macrocells and picocells are mixed, as illustrated in FIG. 1, which illustrates two cells 100, 102 each operated by base stations 104, 106, and in which a terminal 108 is operating. For improved UL performance it is sometimes better for a terminal to be connected to the picocell rather than the macrocell even if the DL is significantly, e.g. 10-15 dB, stronger from the macrocell than from the picocell. The reason is different max output power, for the macrocell in the range of 40 dBm, while for the terminal around 23 dBm. Another reason is different UL path loss from terminal to picocell and macrocell, respectively, due to different distances and propagation conditions to the respective cell. To mitigate the interference problem, ABSs are introduced, i.e. subframes where the macrocell does not transmit data and hence terminals connected to the picocell can be scheduled. However, pilot symbols, CRS, need to be transmitted from the macrocell also in the ABS subframes. These CRS give rise to significant interference at certain Res, as is illustrated in FIG. 2. Since the terminal has detected the macrocell in the cell search process, and thereby having information about the cell ID and the Res used for CRS, this can be compensated in the terminal by reducing soft values for bits originated from these Res and interfering with Res of the picocell containing data, and thus having impact on effective code rate, as will be further elucidated below. Thus, in the case a CRS of the macrocell happens to only interfere with a CRS of the picocell, which on the other hand is a less likely situation than interfering with an RE of the picocell containing data, the effective code rate of the data transmission within the picocell is not affected. Other examples of methods that can be used are soft value scaling and cancellation. All these methods need an adjustment in the CQI. One can interpret such approach as a simple IC receiver. The reducing of soft values will increase the effective code rate, since reducing basically have the same effect as puncturing. In the case of CRS interference around 9-10% of the Res are reduced and thereby increasing the effective code rate, seen by the terminal, by the same amount.

Figure 3:
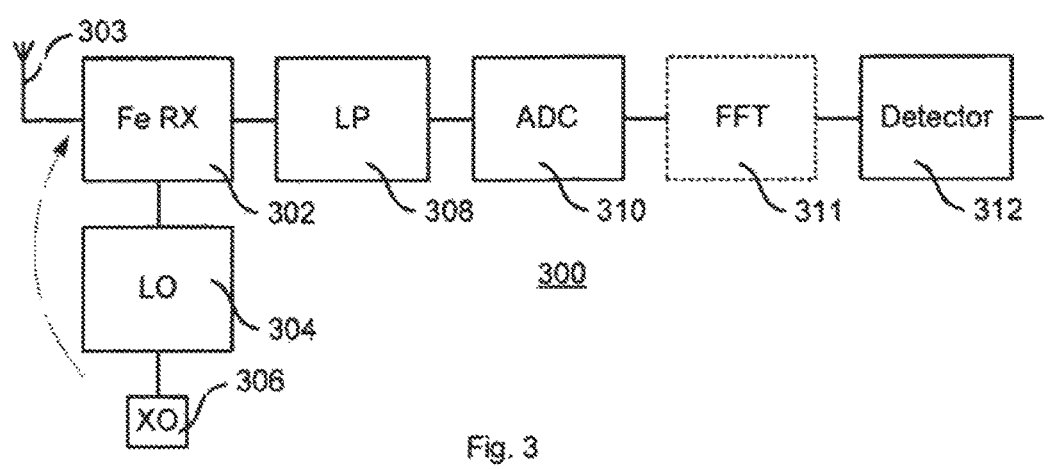
FIG. 3 illustrates a receiver in which internal interference is caused.
Figure 4:
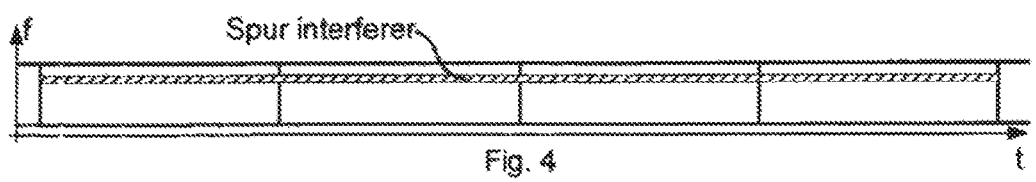
FIG. 4 illustrates a number of subframes received from the first cell, and internal interference caused as illustrated in FIG. 3.

FIG. 3 illustrates a receiver 300 in which internal interference is caused. The receiver 300 comprises a front-end receiver 302 connected to an antenna arrangement 303 and clocked by a local oscillator 304 using a crystal oscillator 306 as reference. The front-end receiver 302 provides its output to a low-pass filter 308, and the signal is further provided to a quantizer 310, and in the case of an OFDM signal, to a Fast Fourier Transformer 311, and then on to a detector 312 and to further higher layer processing. In this scenario, internally, i.e. in the transceiver in the terminal, generated spurs can introduce significant interference on certain sub-carriers, as illustrated in FIG. 3 (dotted arrow) and FIG. 4 (indicated spur frequency). This is especially the case at low signal levels close to the reference sensitivity level where spurs can affect the performance. The spurs are typically generated by the crystal oscillator and harmonics can hit one or a few subcarriers in the received frequency band. Since the crystal oscillator frequency is known, and also which potential harmonics that could interfere with the some sub-carriers, one way to mitigate such interference is by reducing soft values for bits originated from these affected Res, as illustrated in FIG. 4. Also in this case, the code rate increase is basically proportional to number of affected sub carriers and Res in relation to the total amount of subcarriers and Res, respectively.

The basic concept of the invention is that the terminal determines the CQI transmitted to the network node not only based on the current SNR of the received signal, which for example is estimated using the CRSs, but also based on prior knowledge of number of reduced soft values. Reduction of soft values might be needed for resource element that is severely distorted by known interferers. In one embodiment, the interferer is known pilot or reference symbols, or other known symbols, transmitted from an adjacent neighbouring network node that introduces significant interference on certain resource elements, i.e. the neighbouring cell can be considered, from a signal point of view, to cover an essential part of the cell on which the terminal is camping. Here, it should be noted that the actual coverage of the cell on which the terminal is camping is not crucial in itself, since it is the signal environment at the place where the terminal is actually located, and coverage at other positions does not technically influence the function of the invention. Further, the term cell should be construed in view of its function in a cellular system, where a "cell" may be divided into sectors, each working as a cell on its own. In another embodiment the known interferer could be a spur signal internally generated in the transceiver, that is known to interfere a certain number of sub-carrier and thereby, for improved performance, reduction of soft values for bits transmitted on these resource elements are needed. Reduction of soft values will affect, i.e. increase, the effective code rate and hence this knowledge is taken into account in the CQI determination. With the proposed invention the CQI index is adapted to the current receiver performance and thereby optimized throughput is achieved.

The concept can be used in two main approaches: doing the reduction and calculating the CQI based on the reduction; or estimating capacity, doing reduction based on estimated capacity, re-estimating capacity after reduction, and calculating CQI based on re-estimated capacity. In the first approach, the CQI is directly mapped on the made reduction, and in the second approach, the CQI is indirectly mapped on the made reduction, i.e. on the achieved capacity after reduction.

Figure 5:
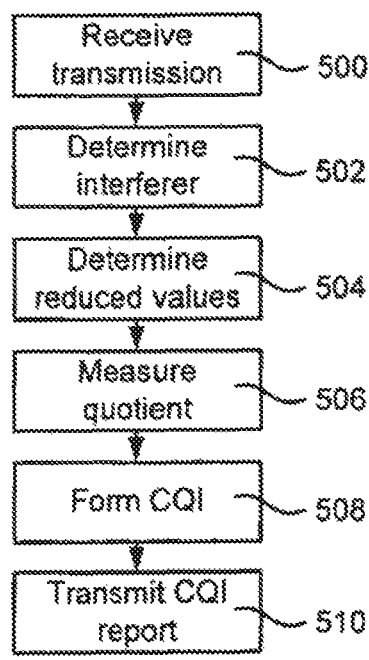
FIG. 5 is a flow chart illustrating a method according an embodiment according to a first approach.

FIG. 5 is a flow chart illustrating a method where the first approach is employed. A transmission is received 500 by a terminal from a base station operating a first cell on which the terminal is currently camping. Further, a present interferer is determined 502. The interferer can for example be another cell performing transmissions occupying frequencies and time instants comprised in the transmission from the first cell. The interfering cell can for example be a macrocell spreading its transmissions over the coverage area of the first cell, which then can be considered as a picocell (or microcell or cell of another level, depending on used terminology for the cellular system). The interfering cell can also be a neighbouring cell, although this problem should have been solved by proper cell planning and frequency allocation. Further, the interferer can be a spur generated internally in the terminal, as described above. A combination of any of these is of course possible. The determination 502 of the interferer includes determination of frequency and/or time occupation of the interferer. For the case of a spur, the interferer may be present at all times of the period of consideration of the determination, and on a specific frequency due to the cause of the spur being an oscillator running the whole period on a certain frequency. For the case of another interfering cell, the overlap may be present on certain frequencies at certain time instants of the period of consideration of the determination. The information on when in time and where in frequency the interferer is present, it is possible to conclude what values of the received signal that are hit by the interferer. Based on this, those interfered values, i.e. values that are reduced, are determined 504. Further, a quotient between desired and non-desired signals is measured 506. This can for example be SNR, SIR, SINR or other type of quotient that is preferred or devised for channel quality calculations. It should be noted that the order of the actions 500, 502, 506 need not be in the specified order, although that of course is possible. For example, the determination 502 of the interferer may be made periodically, and can thus have been made prior the reception 500 of the transmission, i.e. the determination 502 of the interferer is considered valid for several receptions 500 of the transmission. Similarly, the measurement 506 of the quotient can be made prior the determination 502 of the interferer, but need of course be made after the reception 500 of the transmission. The determination 502 of the interferer can also be made prior the reception 500 of the transmission, and for each transmission. The latter can have the advantage of the transmission not "interfering" the determination of the interferer. The actions 500, 502, 506 can also be performed essentially simultaneously.

When reduction of interfered values is determined 504, and the quotient is measured 506, a CQI is formed based on the quotient and the amount of reduced values. Thus, the CQI takes into account the signal quality based on the measured quotient, but also takes into account any change in effective code rate based on the performed determination of reduction of values. The CQI is then transmitted 510 to the base station of the camping cell as a CQI report.

Figure 6:
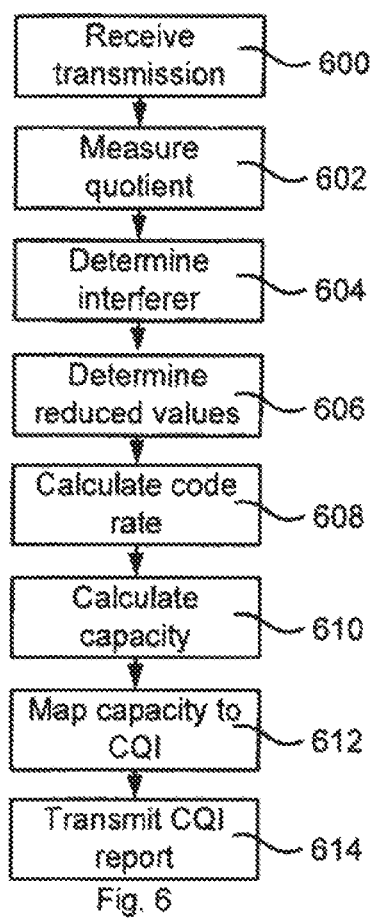
FIG. 6 is a flow chart illustrating a method according to an embodiment according to a second approach.
Figure 7:
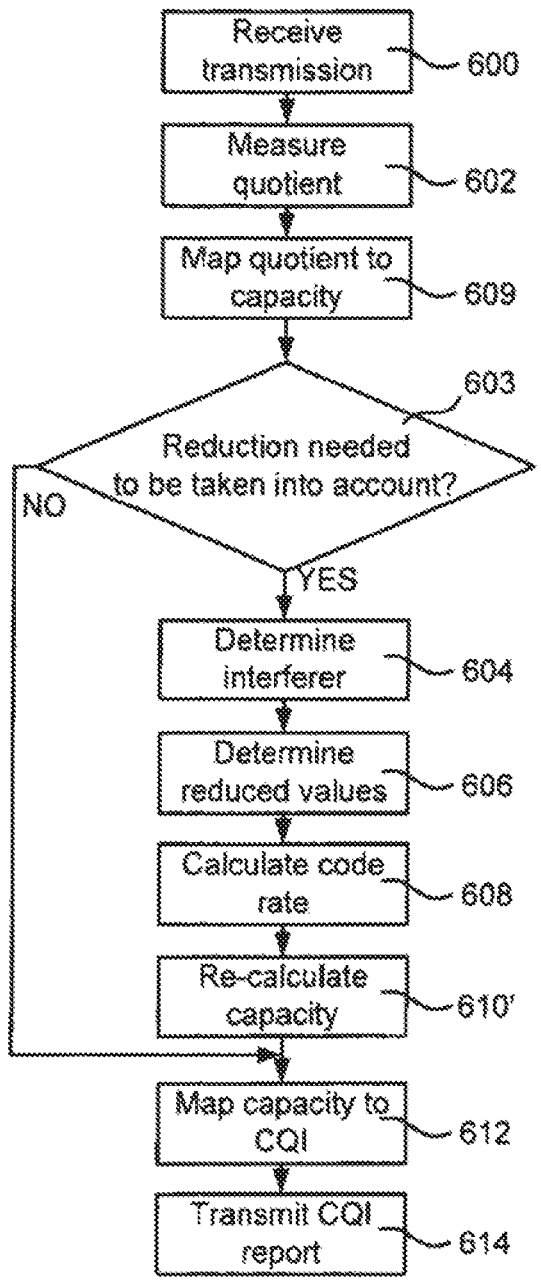
FIG. 7 is a flow chart illustrating a method according to an embodiment according to the second approach.

FIGS. 6 and 7 are flow charts illustrating methods where the second approach is employed. FIG. 6 illustrates a basic embodiment to provide an improved CQI report according to the second approach, and FIG. 7 illustrates an embodiment with optional conditional determination of reduction of interfered values based on a preliminary determined capacity. For actions of the respective embodiments being mutually similar, the same reference numerals are used for convenience of comparison of the embodiments.

For the basic embodiment, similar to the embodiment demonstrated with reference to FIG. 5, a transmission is received 600, a quotient is measured 602, e.g. SNR, SIR or SINR, the interferer is determined 604, and reduction of interfered values is determined 606. Based on the determined reduction 606, an effective code rate is calculated 608. Based on the effective code rate, capacity of the channel is calculated 610. The calculated capacity is then mapped 612 to a proper CQI, and a CQI report is transmitted 614 to the base station. For the conditional embodiment, similar actions of receiving 600 a transmission and measuring 602 a quotient are performed. Then, the measured quotient is mapped 609 to channel capacity, and then it is determined 603 whether any reduction is needed to be taken into account. If the capacity is sufficient, i.e. no reduction is needed to be taken into account, the mapped capacity is in turn mapped 612 to CQI and the CQI is reported in a transmission 614 to the base station. However, if reduction is needed to be taken into account, the similar actions as demonstrated with reference to FIG. 6 are performed, i.e. determining 604 the interferer, determining reduction 606, i.e. amount of interfered values, and calculation 608 of effective code rate. The capacity is re-calculated 610' and then the re-calculated capacity is mapped 612 to CQI and the CQI is reported in a transmission 614 to the base station. Here, it should be noted that the action of determining 604 the interferer is illustrated to be performed only upon the conditions of needed consideration of reduction. However, in practice, the interferer may be determined anyway, e.g. prior reception of the transmission or for several transmissions, as demonstrated with reference to FIG. 5.

Figure 10:
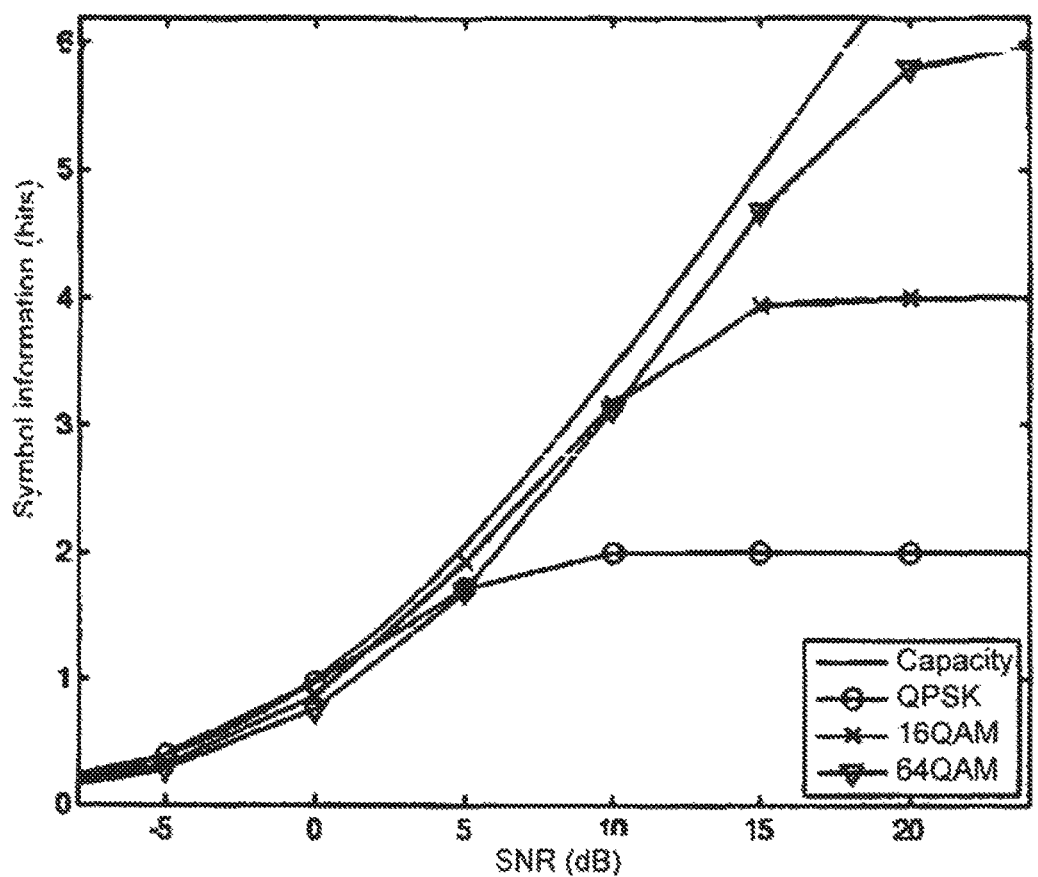
FIG. 10 is a diagram illustrating mapping of channel capacity and SNR for different modulation schemes.

In common for the approaches the terminal can on a regular basis, e.g. every subframe, estimate the quotient of the received signal. The quotient is typically estimated using some kind of pilots or reference symbols and the method is not limited by the invention. Based on the quotient a CQI index is determined. This is typically based on using the mean value of an adjusted channel capacity over some points on the time-frequency grid in a subframe. The capacity, in bits, can be calculated as $C=BW*\log 2(I+Q)$, where BW is the bandwidth, I is the unity matrix, and Q is a matrix representing the quotient. The adjustment of the capacity is for compensating for e.g. coding losses, channel estimation losses and modulation restrictions. Typically such curve may look like FIG. 10 for different modulations. The mean value can then be mapped onto a CQI value by using table 7.2.3-1 in 3GPP 36.213 specification. A control unit can then determine whether there is any determination of reduction of soft values needed, as of the method illustrated in FIG. 7. The reasons for determination of reduction of soft values for bits/symbols transmitted on certain resource elements can be as has been described above. Based on the number of soft values that are reduced, the control unit determines how this will affect the effective code rate. As an addition to only use the number of reduced soft values, also the placement of the reduced values and/or allocation size can be taken into consideration. These extra options take advance of the code block layout on the time-frequency grid. The modified CQI value is determined based on the amount of reduced soft values. In one embodiment, the puncturing can for instance be mapped to an "effective SIR degradation due to puncturing", which is then used in combination to the estimated SIR for determination of a modified CQI. Such "SIR degradation" information can be stored in a look-up table and be based on lab experiment earlier made. In another embodiment, the puncturing can be mapped to symbol information degradation that is then reduced from the symbol information determined upon considering the need for reduction and a modified symbol information is then mapped to a modified CQI. Finally the terminal transmits the modified CQI to the network on regular basis, defined by parameters the terminal received during connection setup with the network node, or in later signalling between the network node and the terminal.

An example of how a reported CQI value may change due to soft value reduction is to assume that there are 100 data Res that transmit data symbols, and 10 reference Res that transmit pilot symbols. Assume that 10 out of the 100 data Res have strong interference from e.g. a macrocell, and that an estimated SNR from the pilot symbols is 10 dB, which corresponds to approximately an average capacity of 3 bits per RE. The terminal knows and takes the interferer into account, the capacity becomes 90 times 3 (the non-interfered Res) plus 10 times 0 (the interfered Res assumed to have capacity 0) divided by 100 (the total number of data Res), which is 2.7 bits per RE. From table 7.2.3-1 in 3GPP 36.213 specification this would give us CQI 9. The uncorrected calculation of 3 bits per RE would give CQI 10.

Figure 8:
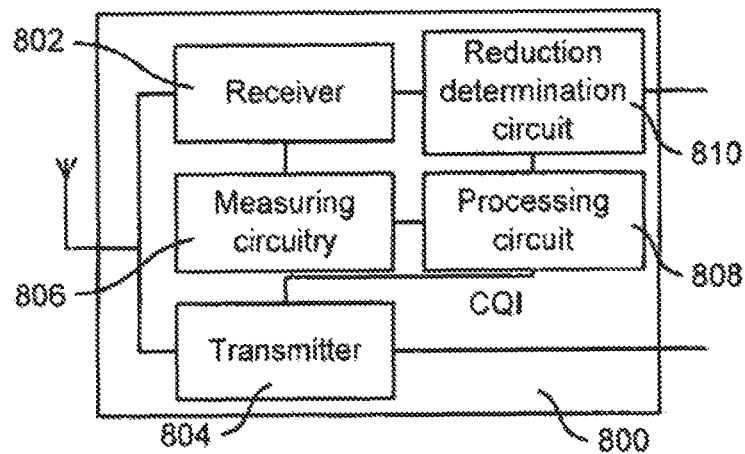
FIG. 8 is a block diagram schematically illustrating a transceiver according to embodiments.

FIG. 8 is a block diagram schematically illustrating a transceiver 800 according to embodiments. The transceiver 800 is arranged to operate in a cellular communication system as elucidated above with reference to the demonstrated methods. The transceiver comprises a receiver 802 and a transmitter 804 connected to some antenna arrangement comprising one or more antennas. The transceiver 800 further comprises measuring circuitry 806 which comprises an interference monitor which is arranged to determine information about an interferer received through the receiver 802, i.e. from another cell and/or an internally generated spur as demonstrated above. The measuring circuitry 806 also comprises a signal measuring circuit arranged to measure a quotient between desired and non-desired signals, as also demonstrated above. The measuring circuitry 806 provides results to a processing circuit 808, i.e. a controller. The measuring circuitry 806 can be a part of the receiver 802, part of the processing circuit 808, or a separate circuit. The processing circuit 808 is arranged to form a CQI, which is provided to the transmitter 804 for reporting to the cellular network. The processing circuit 808 is further arranged to control a reduction determination circuit 810 which is arranged to determine reduced values in the received signal corresponding to the interfering signal, wherein the processing circuit 808 may determine whether determination of reduced values is needed to be taken into account, and enabling/disabling the function of the reduction determination circuit 810. Here, the reduction determination circuit 810 can be a part of the processing circuit 808, e.g. functionally integrated, or a separate circuit. The processing circuit 808 forms the CQI in dependence of performed reduction of values. This can be either by basing the CQI on the measured quotient and the performed reduction, or based on a calculation of capacity, which is the result of any performed reduction. Here, optionally, the processor is arranged to determine whether any reduction should be made at all based on an initial calculation of capacity.

The structure demonstrated above have the capability to determine nature of the interfering signal to perform the control of the reduction determination circuit 810 to determine reduced values of the received signal. The occupation in time and/or frequency, and also the allocation of the interferer is determined for this. This information can also be used for the forming of the CQI.

Figure 9:
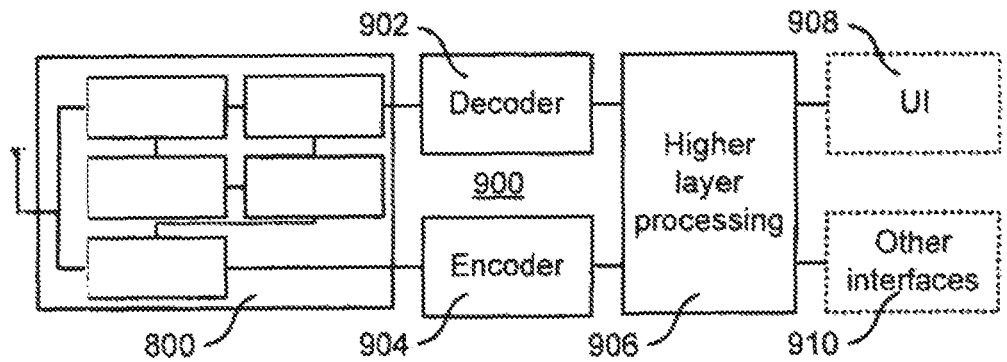
FIG. 9 is a block diagram schematically illustrating a cellular device according to embodiments.

FIG. 9 is a block diagram schematically illustrating a cellular device 900 according to an embodiment. The cellular device 900 can be a mobile terminal, such as a mobile phone, a WWAN module or a WWAN capable device. The cellular device 900 comprises a transceiver 800 as the one demonstrated with reference to FIG. 8. The transceiver 800 provides received values to a decoder 902, and receives values from an encoder 904 to be transmitted to the cellular network. The decoder 902 and the encoder 904 are connected to circuitry 906 for higher layer processing, which is not further elucidated here not to obscure the gist of the invention. The cellular device 900 can further comprise a user interface 908 and/or further interfaces 910, e.g. USB, IEEE 1394, or proprietary interfaces, for connecting to further devices.

Figure 11:
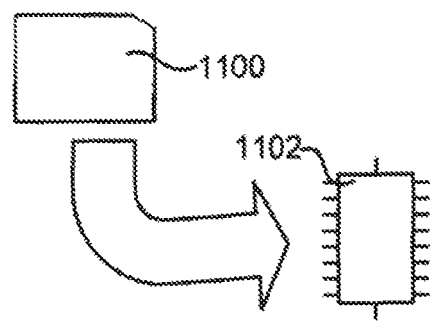
FIG. 11 schematically illustrates a computer-readable medium comprising instructions, which when executed on the illustrated processor are arranged to implement any of the methods illustrated in FIGS. 5 to 7.

The methods according to the present invention is suitable for implementation with aid of processing means, such as computers and/or processors, especially for the case where the transceiver as depicted in FIG. 8 has signal processing implemented by programmable processing means, such as including a signal processor. Therefore, there is provided computer programs, comprising instructions arranged to cause the processing means, processor, or computer to perform the steps of any of the methods according to any of the embodiments described with reference to FIGS. 5 and 6. The computer programs preferably comprises program code which is stored on a computer readable medium 1100, as illustrated in FIG. 11, which can be loaded and executed by a processing means, processor, or computer 1102 to cause it to perform the methods, respectively, according to embodiments of the present invention, preferably as any of the embodiments described with reference to FIGS. 5 to 7. The computer 1102 and computer program product 1100 can be arranged to execute the program code sequentially where actions of the any of the methods are performed stepwise. The processing means, processor, or computer 1102 is preferably what normally is referred to as an embedded system. Thus, the depicted computer readable medium 1100 and computer 1102 in FIG. 11 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method of a transceiver arranged to operate in a cellular communication system comprising cells, the method comprising receiving a signal transmitted from a first cell;
determining an interfering signal and its occupation in time and/or frequency, wherein the interfering signal comprises one or more reference symbols transmitted from a second cell in respective resource elements of an almost blank subframe;
reducing soft bit values for bits of one or more received symbols in the received signal corresponding to the occupation in time and/or frequency of the reference symbols in the interfering signal to obtain reduced values for the bits of the received symbols;
measuring a quotient indicative of a signal quality of the received signal;
forming a channel quality index, CQI, based on the measured quotient and the reduced values; and
reporting the CQI to the communication system.

2. The method according to claim 1, wherein determining an interfering signal comprises determining a spur signal internally generated in the transceiver.

3. The method according to claim 1, wherein the forming of the CQI is further based on position of occupation in time and/or frequency of the reduced values in the subframe.

4. The method according to claim 1, wherein forming of the CQI is further based on allocation size of the reduced values.

5. A method of a transceiver arranged to operate in a cellular communication system comprising cells, the method comprising
receiving a signal transmitted from a first cell;
measuring a quotient indicative of a signal quality of the received signal;
determining an interfering signal and its occupation in time and/or frequency, wherein the interfering signal comprises one or more reference symbols transmitted from a second cell in respective resource elements of an almost blank subframe;
determining, based the interfering signal and its occupation in time and/or frequency, a channel quality index, CQI, by:
reducing soft bit values for bits of one or more received symbols in the received signal corresponding to the occupation in time and/or frequency of the reference symbols in the interfering signal to obtain reduced values for the bits of the received symbols;
calculating an effective code rate based on the reduced values;
calculating an adapted capacity based on the effective code rate;
mapping the adapted capacity to the channel quality index, CQI; and
reporting the CQI to the communication system.

6. The method according to claim 5, further comprising mapping the measured quotient to an estimated capacity, and determining whether reduction of the soft bit values is needed based on the estimated capacity.

7. The method of claim 6 wherein determining, based the interfering signal and its occupation in time and/or frequency, a channel quality index is performed when it is determined that reduction in the soft bit values is needed.

8. The method of claim 7 further comprising determining the CQI based on the estimated capacity when it is determined that reduction of the soft bit values is not required.

9. A transceiver arranged to operate in a cellular communication system comprising cells, the transceiver comprising
a receiver configured to receive a signal transmitted from a first cell;
a signal measuring circuit configured to measure a quotient indicative of a signal quality of the received signal;
an interference monitoring circuit configured to determine an interfering signal and its occupation in time and/or frequency, wherein the interfering signal comprises one or more reference symbols transmitted from a second cell in respective resource elements of an almost blank subframe;
a reduction determination circuit configured to reduce soft bit values for bits of one or more received symbols in the received signal corresponding to the occupation in time and/or frequency of the reference symbols in the interfering signal to obtain reduced values for the bits of the received symbols;
a processing circuit configured to form a channel quality index, CQI, based on the measured quotient and the reduced values; and
a transmitter arranged to transmit a report of the CQI to the communication system.

10. The transceiver according to claim 9, wherein the interference monitoring circuit is configured to determine a spur signal internally generated in the transceiver.

11. The transceiver according to claim 9, wherein the processor circuit is further configured to form the CQI based on position of occupation in time and/or frequency of the reduced values in the subframe.

12. The transceiver according to claim 9, wherein the processor circuit is further configured to form the CQI based on allocation size of the reduced values.

13. A transceiver arranged to operate in a cellular communication system comprising cells, the transceiver comprising
a receiver arranged to receive a signal transmitted from a first cell;
a signal measuring circuit arranged to measure a quotient indicative of a signal quality of the received signal;
an interference monitoring circuit configured to determine an interfering signal and its occupation in time and/or frequency, wherein the interfering signal comprises one or more reference symbols transmitted from a second cell in respective resource elements of an almost blank subframe;
a reduction determination circuit configured to reduce soft bit values for bits of one or more received symbols in the received signal corresponding to the occupation in time and/or frequency of the reference symbols in the interfering signal to obtain reduced values for the bits of the received symbols;
a processing circuit configured to:
calculate effective code rate with regard to the determined reduction;
calculate an adapted capacity based on the determined reduction; and
map the capacity to a channel quality index, CQI; and
a transmitter arranged to transmit a report on the CQI to the communication system.

14. The transceiver according to claim 13, wherein the processing circuit is further configured to:
map the quotient to an estimated capacity, and
determine whether reduction of the soft bit values is needed based on the estimated capacity.

15. The transceiver of claim 14 wherein, the processor circuit is configure to determine the channel quality index based the interfering signal and its occupation in time and/or frequency when it is determined that reduction in the soft bit values is needed.

16. The transceiver of claim 15 wherein, the processor circuit is configure to determining the CQI based on the estimated capacity when it is determined that reduction of the soft bit values is not required.

17. A non-transitory computer readable medium comprising executable program code that when executed by a processor circuit in a transceiver causes the transceiver to:
    receive a signal transmitted from a first cell;
    determine an interfering signal and its occupation in time and/or frequency, wherein the interfering signal comprises one or more reference symbols transmitted from a second cell in respective resource elements of an almost blank subframe;
    reduce soft bit values for bits of one or more received symbols in the received signal corresponding to the occupation in time and/or frequency of the reference symbols in the interfering signal to obtain reduced values for the bits of the received symbols;
    measure a quotient indicative of a signal quality of the received signal;
    form a channel quality index, CQI, based on the measured quotient and the reduced values; and
    report the CQI to the communication system.

18. A non-transitory computer readable medium comprising executable program code that when executed by a processor circuit in a transceiver causes the transceiver to:
    receive a signal transmitted from a first cell;
    measure a quotient indicative of a signal quality of the received signal;
    determine an interfering signal and its occupation in time and/or frequency, wherein the interfering signal comprises one or more reference symbols transmitted from a second cell in respective resource elements of an almost blank subframe;
    reduce soft bit values for bits of one or more received symbols in the received signal corresponding to the occupation in time and/or frequency of the reference symbols in the interfering signal to obtain reduced values for the bits of the received symbols;
    calculate an effective code rate based on the reduced values;
    calculate an adapted capacity based on the effective code rate;
    map the adapted capacity to the channel quality index, CQI; and
    report the CQI to the communication system.

* * * * *